Feb. 20, 1968 — J. P. HELCK — 3,369,414

FLEXIBLE THREAD SYSTEM

Filed June 2, 1966

INVENTOR
JERRY P. HELCK
Francis B. Henry
BY ATTORNEY

United States Patent Office 3,369,414
Patented Feb. 20, 1968

3,369,414
FLEXIBLE THREAD SYSTEM
Jerry P. Helck, Summit, N.J., assignor to Air Reduction Company, Incorporated, New York, N.Y., a corporation of New York
Filed June 2, 1966, Ser. No. 554,813
13 Claims. (Cl. 74—89)

This invention relates to mechanisms for adjusting apparatus under great pressure. More particularly, this invention relates to a threaded adjustment member which is capable of a high degree of resolution of adjustment while sustaining a large loading force.

An object of this invention is to provide an improved threaded adjustment mechanism which utilizes a flexible thread.

Another object of the invention is to provide a threaded adjustment mechanism which is capable of being minutely adjusted while under a large compressive force.

Another object of the invention is to provide a greatly simplified and inexpensive threaded adjustment mechanism which can be utilized in high pressure systems.

A further object of the invention is to provide a threaded adjustment mechanism of reduced size and improved operation to replace the conventional threaded adjustment mechanism used in high pressure system. Other objects, features and advantages will appear or be pointed out as the description proceeds.

In the drawing, in which like reference characters indicate corresponding parts in all views.

Figure 1:
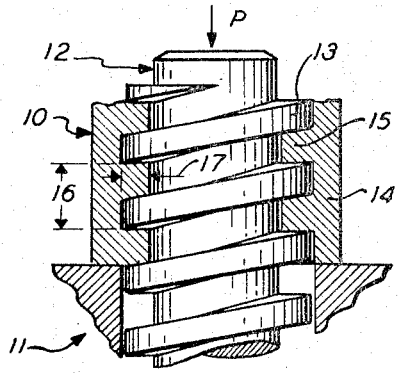
FIGURE 1 is a view, partly in section, through a prior art form of threaded adjustment member.

Heretofore, whenever a threaded adjustment mechanism was to be placed under excessive loads, the mechanism was usually designed in the manner shown in FIGURE 1. The mechanism, indicated generally by reference number 10, is supported on a rigid member 11. The mechanism comprises a shaft 12 having a helically arranged, square thread system 13 rigid therewith. A nut 14 is threaded on the shaft and abuts the rigid member 11. Normally the shaft 12 is constrained from rotating by means, not shown, but is of course free to be adjusted in an axial sense. The normal loading force P is usually applied in an axial direction as shown in FIGURE 1. By rotating the nut 14 by any suitable means the shaft 12 is moved axially to adjust the load P. By rotating the nut 14 one complete revolution, the shaft is advanced the distance 16. Allowable shear and bending stresses in the threads of the weaker material determine the dimensions of the thread form and hence the lead distance 16 which is the amount the shaft is advanced for every revolution of the nut. When this type of threaded adjustment member is used in a high pressure system square threads generally must be utilized due to the pressures involved. Furthermore, the minimum lead 16 must be approximately equal to double the depth 17 of the thread. Thus it is clear from the above description and from viewing FIGURE 1 that the conventional threaded adjustment mechanism has a low degree of resolution of adjustment. For example, when the nut 14 is rotated a slight amount, the shaft 12 advances a considerable distance and thus the load P may not be minutely adjusted.

Figure 2:
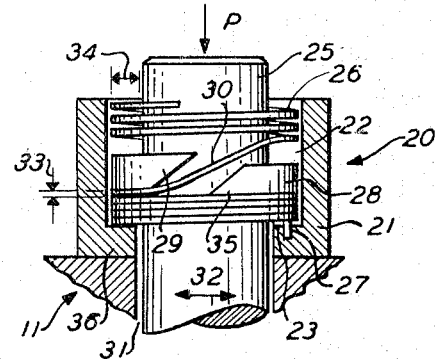
FIGURE 2 is a view, partly in section, through a threaded adjustment member made in accordance with this invention.

The embodiment of the invention shown in FIGURE 2 and hereinafter described provides for minute adjustment of the load P even when the load is great. The mechanism 20 is supported on a rigid member 11 which may, for example, be part of the housing of a pressure regulator. The rigid member 11 has a cylindrical opening 31 through which a shaft 25 extends. The shaft is loaded at one end P and is capable of being rotatably adjusted 32 at its other end by any known means. Abutting said rigid member 11 is a nut like member 21 which has an interior cylindrical surface 22 and a bottom radial surface 23. Anchored to said bottom surface at 27 is a helically arranged flexible member 26. As shown in FIGURE 2, this last mentioned member 26 is coaxial with the shaft 25 and surrounds the same. The member 26 is preferably rectangular in cross section, having a major dimension 34 and a minor dimension 33.

Rigidly mounted on the shaft 25 is a single turn thread 28 with a pitch or lead substantially equal to the minor dimension 33 of the flexible member 26. The single thread 28 has curved end portions 29, 35 which are spaced to admit a portion 30 of the flexible member 26. As illustrated in FIGURE 2, the axial force P compresses the flexible member 26 between the thread 28 and the radial surface 23. Thus the force P is transmitted to the thrust collar 36 and not to internal threads as in FIGURE 1.

The loading force P may be adjusted in the embodiment shown in FIGURE 2 by rotating the shaft 25. Each complete revolution of the shaft will only advance the shaft a distance 33 in an axial sense. Thus a high degree of resolution of adjustment of the force P is obtained in the embodiment shown without forsaking the mechanism's ability to withstand substantial axial forces. Nut 21 may also be rotated and used to advance the shaft 25 when it is constrained from rotating.

Furthermore, due to the fact that a thrust collar 36 receives the axial forces instead of interior screw threads, the adjustment mechanism shown in FIGURE 2 will withstand axial forces equal to the conventional device, shown in FIGURE 1.

A further advantage is that the mechanism shown in FIGURE 2 takes up considerably less space than the conventional device due to the absence of a continuous helical thread on the shaft.

In one variation of the preferred embodiment shown in FIGURE 2 the single turn thread 28 could be mounted on the nut 21 and the flexible helical member 26 could be mounted on the shaft 25. Substantially the same operational result would be obtained if such a modification were utilized.

In another variation one or more roller followers can replace the single turn thread. The roller or rollers can be mounted on the shaft and the flexible helical member on the nut or vice versa. If a plurality of rollers are used, they may be helically arranged with a pitch or lead substantially equal to the minor dimension of the flexible member.

Figure 3:
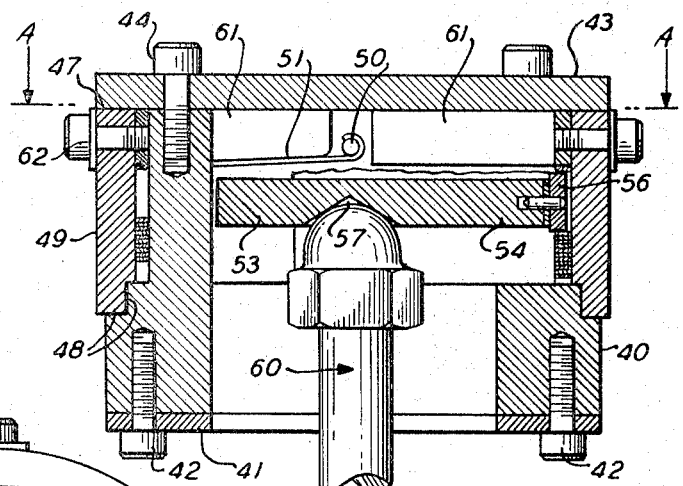
FIGURE 3 is a view, partly in section, partly broken away, of an embodiment of the instant invention.

In FIGURE 3 there is illustrated an embodiment of the instant invention in which a single flexible helical member is used. The mechanism comprises an annular spring case 40 mounted on a fixture plate 41 by means of bolts 42. The plate 41 is rigidly fixed to a support, not shown. A top plate 43 is bolted 44 to the spring case, said plate and case having bearing surfaces 47, 48 which rotatably support an annular bezel 49. Fixedly mounted to the bezel is a grooved pin 50 to which is attached the end of the flexible helical spring 51. The upper turn of the spring abuts against an arcuate ring member 61 which is fixed to bezel 49. Slidably mounted within the stationary spring case 40 is a spider 53, having radially extending arms 54, one of which is shown, on the ends of which are mounted rollers 56. The arms of the spider extend into and are guided by openings in the spring case so that the spider can move axially but is unable to rotate. The center portion of the spider is hollowed out 57 to receive a force transmitting shaft member 60. The direction of the force is indicated by the arrow P. The rollers on the ends of the spiders are located between the turns of the flexible spring and thus act to transmit the force to the ring member 61 which is fixed to the bezel by means of bolts 62. The bezel therefore transmits the force to the top plate 43.

In the embodiment illustrated in FIGURE 3, a single helical spring is used in conjunction with three rollers. By rotating the bezel by hand, the spring is turned and this in turn forces the spider to move axially. Movement of the spider causes the shaft member 60 to be shifted axially and thus the transmitted force P may be adjusted. The designation P is used to symbolize any of the well known types of force originators, such as a spring or an air cylinder. This flexible thread system may, therefore, be used to adjust the output of these force originators.

In the type of construction illustrated in FIGURE 3, one or more sets of springs and rollers may be utilized depending on the size of the mechanism desired. Furthermore as mentioned previously, the rollers may be arranged helically with a pitch equal to the minor dimension of the flexible member.

Figure 4:
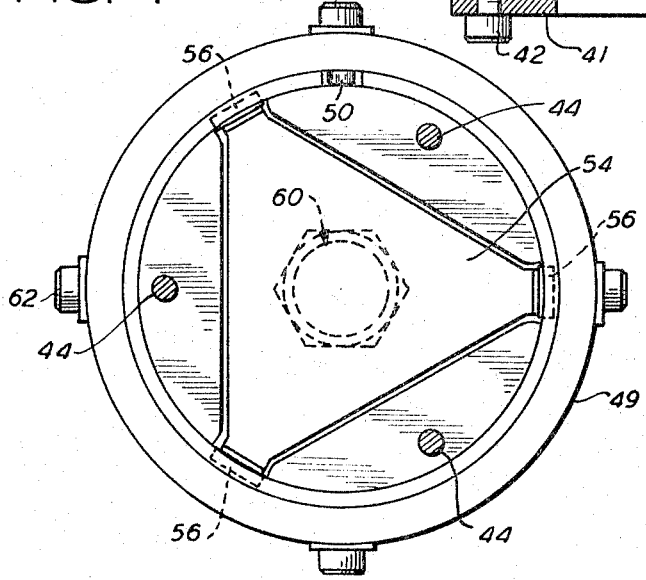
FIGURE 4 is a sectional view taken along the line A—A in FIGURE 3.

FIGURE 4 illustrates in plan view the form of the spider and its slidable mounting in the spring case 40.

While preferred embodiments of the invention have been described, it is to be understood that changes and variations may be made without departing from the spirit and scope of the invention as defined by the appended claims.

I claim:

1. An adjustable force transmitting mechanism comprising, a housing means having an opening, shaft means movably mounted in said opening, a helical member coaxial with said shaft means and surrounding the same, said helical member being compressible with respect to said shaft means and being fixedly connected at one of its ends to one of said means, a second coaxial helical member surrounding said shaft means and being threaded between the convolutions of said first helical member, said second helical member being fixedly connected to one of said means and being substantially incompressible.

2. The mechanism described in claim 1 in which said second helical member is mounted on said shaft means and said first helical member is fixedly connected to said housing means.

3. The mechanism described in claim 1 in which said second helical member has a single turn.

4. The mechanism described in claim 1 in which the pitch or lead of the second helical member substantially equals the axial dimension of the first helical member.

5. The mechanism described in claim 1 in which said second helical member is rigidly mounted on said housing means and said first helical member is fixedly connected to said shaft means.

6. The mechanism described in claim 1 in which an axial force on said shaft means thrusts said helical members against said housing means, the entire axial force being transmitted to said housing means through said helical members.

7. The mechanism described in claim 1 in which the housing means comprises a nut which is rotatably mounted on said shaft means.

8. An adjustable force transmitting mechanism comprising, a housing means having an opening, shaft means movably mounted in said opening, a flexible member coaxial with said shaft means and extending around the same, said member being anchored to one of said means, a projection means mounted on one of said means and extending therefrom and abutting said flexible member so that axial forces in said shaft means are transmitted to the flexible member.

9. The mechanism described in claim 8 in which the flexible member is a helical spring and the projection extends between the convolutions of said spring.

10. The mechanism described in claim 8 in which the projection is in the form of a helical thread like member.

11. The mechanism described in claim 8 in which the projection means comprises a roller.

12. The mechanism described in claim 8 in which said projection means comprises a plurality of rollers helically arranged around said shaft.

13. An adjustable force transmitting mechanism comprising, housing means having an opening, annular bezel means rotatably mounted on said housing means, a spider member slidably mounted in said housing means, at least one flexible helical member fixedly attached at one end to said bezel means and being substantially coaxial and rotatable therewith, said spider member having at least one outer projection extending between the convolutions of said helical member and a force transmitting member extending into said opening and contacting said spider member.

No references cited.

FRED C. MATTERN, JR., *Primary Examiner.*

F. D. SHOEMAKER, *Assistant Examiner.*